US012455111B2

(12) United States Patent
Okruch et al.

(10) Patent No.: US 12,455,111 B2
(45) Date of Patent: Oct. 28, 2025

(54) HANDLE ASSEMBLY WITH BACKUP RETENTION FEATURES

(71) Applicant: Haier US Appliance Solutions, Inc., Wilmington, DE (US)

(72) Inventors: Matthew Okruch, Louisville, KY (US); Edward Strauss, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 78 days.

(21) Appl. No.: 18/470,002

(22) Filed: Sep. 19, 2023

(65) Prior Publication Data

US 2025/0093090 A1 Mar. 20, 2025

(51) Int. Cl.
*F25D 23/02* (2006.01)
*E05B 1/00* (2006.01)

(52) U.S. Cl.
CPC .......... *F25D 23/028* (2013.01); *E05B 1/0015* (2013.01)

(58) Field of Classification Search
CPC .. F25D 23/028; F25D 2400/18; E05B 1/0015; F24C 15/024; Y10S 16/41; A47B 2220/0047; A47B 95/02
See application file for complete search history.

(56) References Cited

U.S. PATENT DOCUMENTS 3,017,657 A * 1/1962 Mills ..................... F24C 15/024 16/443
3,426,385 A * 2/1969 Gutshall ................ A47B 95/02 16/412
3,995,349 A * 12/1976 Roberts .................. A47B 95/02 16/412
4,357,734 A * 11/1982 Moore ................... B60N 3/026 16/442
4,745,656 A * 5/1988 Revlett ................. F25D 23/028 16/DIG. 19
5,860,538 A * 1/1999 Duero .................... A47K 10/08 D6/524
7,992,257 B2 8/2011 Kim
8,813,995 B2 8/2014 Kim et al.
10,401,079 B2 9/2019 Wing
2005/0161461 A1* 7/2005 Shin ...................... F25D 23/028 220/752
2006/0207062 A1* 9/2006 Wing .................... E05B 1/0053 16/412

(Continued)

FOREIGN PATENT DOCUMENTS

CN 215412662 U 1/2022
KR 101030491 B1 4/2011

(Continued)

*Primary Examiner* — Hiwot E Tefera
(74) *Attorney, Agent, or Firm* — Dority & Manning, P.A.

(57) ABSTRACT

A handle assembly for a domestic appliance door includes a handle tube and endcaps that are fastened together through mechanical means. The handle assembly is attached to the appliance door with a primary attachment feature. A backup retention feature is provided to the handle assembly that would engage if the primary retention feature fails. The backup retention feature includes a mechanical interference between a bushing and the handle tube which is designed to maintain attachment of the handle to the door in the event the primary retention feature fails.

19 Claims, 8 Drawing Sheets

(56) References Cited

U.S. PATENT DOCUMENTS

| | | | | |
|---|---|---|---|---|
| 2009/0007385 | A1* | 1/2009 | Kim | F25D 23/028 16/412 |
| 2010/0005631 | A1* | 1/2010 | Drach | E05B 1/0015 16/436 |
| 2011/0220662 | A1* | 9/2011 | Kim | F25D 23/028 312/405 |
| 2012/0234993 | A1* | 9/2012 | Byrne | F25D 23/028 248/201 |
| 2014/0338152 | A1* | 11/2014 | Moody | E05B 1/0015 16/412 |
| 2015/0159936 | A1* | 6/2015 | Oh | F25D 23/028 312/405 |
| 2016/0084567 | A1* | 3/2016 | Fernandez | F25D 23/028 312/405 |
| 2019/0277055 | A1* | 9/2019 | Rogel | E06B 3/4636 |
| 2020/0217515 | A1* | 7/2020 | Wantland | F24C 15/024 |
| 2023/0085049 | A1* | 3/2023 | Farrel | F24C 15/024 126/273 R |
| 2023/0243574 | A1* | 8/2023 | Ha | E05B 1/0015 |

FOREIGN PATENT DOCUMENTS

| | | | |
|---|---|---|---|
| KR | 101401690 | B1 | 5/2014 |
| TW | I287611 | B | 10/2007 |

* cited by examiner

HANDLE ASSEMBLY WITH BACKUP RETENTION FEATURES

FIELD OF THE INVENTION

The present subject matter relates generally to domestic appliances, and more particularly, the present disclosure relates to handle assemblies for domestic appliances.

BACKGROUND OF THE INVENTION

Domestic appliances (e.g., refrigerators, ovens, microwaves, etc.) typically include doors to open and close certain receiving spaces or drawers which can be withdrawn and inserted for easy storage of items. These doors (or drawers) include handles attached thereto which can be grasped and pulled by a user to gain access to the receiving space via the door or drawer. The handles include connection points at which the handle is connected to the appliance (e.g., the door or drawer).

However, with some current handle assemblies, failure of one component may lead to a catastrophic failure of the attachment of the handle to the door or drawer. This may render the receiving space or the drawer interior inaccessible. This may lead to consumer dissatisfaction as the domestic appliance is largely or completely useless while awaiting the handle repair. Accordingly, a handle assembly that provides a fallback retention feature to maintain functional attachment of the handle if the primary attachment mechanism fails would be useful.

BRIEF DESCRIPTION OF THE INVENTION

Aspects and advantages of the invention will be set forth in part in the following description, may be apparent from the description, or may be learned through practice of the invention.

In one exemplary aspect, a handle assembly for a domestic appliance is presented. The handle assembly defines an axial direction and a radial direction and comprises an end cap, a bushing, and a handle tube. The end cap defines a receiving portion aligned with the axial direction, the end cap further defining a through hole aligned with the radial direction. The bushing comprises a first end, a second end, and a bushing wall defining a receptacle at the second end, the bushing is received in the through hole. The handle tube defines an axial slot formed at a first end, wherein the first end of the handle tube is axially received in the receiving portion of the end cap, wherein the first end of the bushing extends into the receiving portion.

In another exemplary aspect, a domestic appliance is presented, the domestic appliance comprising a cabinet, a door for providing selective access to an interior of the cabinet, and a handle assembly attached to the door and defining an axial direction and a radial direction. The handle assembly comprises an end cap defining a receiving portion aligned with the axial direction, the end cap further defining a through hole aligned with the radial direction. The assembly further comprises a bushing comprising a first end, a second end, a bushing wall defining a receptacle at the second end, the bushing received in the through hole, and a handle tube defining an axial slot formed at a first end. The first end of the handle tube is axially received in the receiving portion and the first end of the bushing extends into the receiving portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
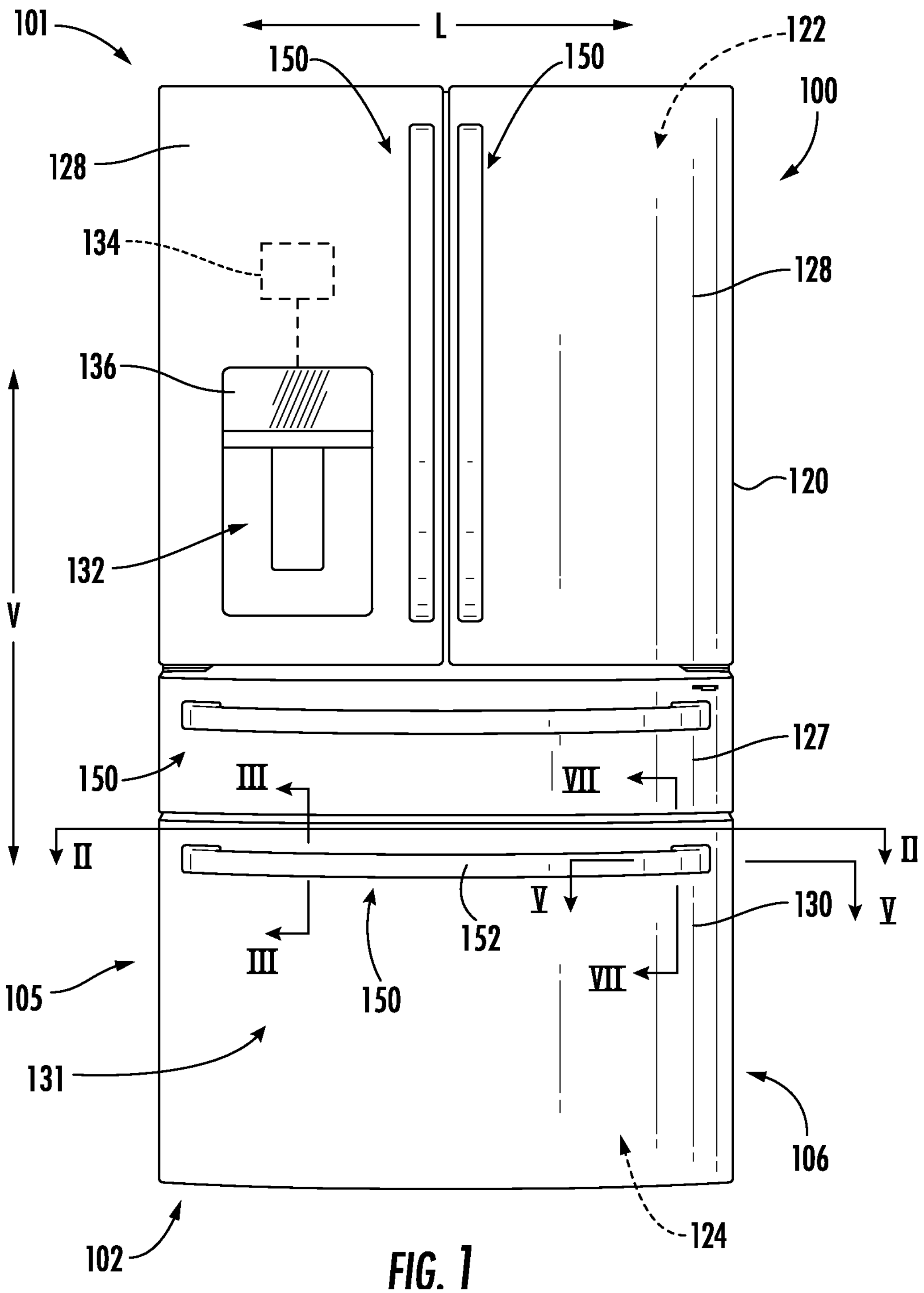
FIG. 1 provides a front view of a refrigerator appliance according to exemplary embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Although exemplary embodiments of the present disclosure are illustrated and discussed with respect to a French door refrigerator appliance, one of ordinary skill will appreciate that the present disclosure may be practiced on other domestic appliances, for example freezers, ovens, microwaves, or refrigerator appliances in other configurations. Accordingly, the illustrative embodiments of this disclosure are illustrative and not limiting in any way.

Turning to the figures, FIG. 1 provides a front view of an embodiment of an exemplary domestic appliance, illustrated here as a refrigerator appliance 100. Refrigerator appliance 100 extends between a top 101 and a bottom 102 along a vertical direction V. Refrigerator appliance 100 also extends between a first side 105 and a second side 106 along a lateral direction L. A transverse direction T may additionally be defined perpendicular to the vertical and lateral directions V, L. Refrigerator appliance 100 extends along the transverse direction T between a front portion and a back portion.

Refrigerator appliance 100 may include a cabinet 120 defining an upper fresh food chamber 122 and a lower freezer chamber or frozen food storage chamber 124 arranged below the fresh food chamber 122 along the vertical direction V. An auxiliary food storage chamber may be positioned between the fresh food storage chamber 122 and the frozen food storage chamber 124, e.g., along the vertical direction V. Because the frozen food storage chamber 124 is positioned below the fresh food storage chamber 122, refrigerator appliance 100 may be generally referred to as a bottom mount refrigerator. In the exemplary embodiment, cabinet 120 may also define a mechanical compartment (not shown) for receipt of a sealed cooling system (not shown). Using the teachings disclosed herein, one of skill in the art will understand that the present technology can be used with other types of refrigerators (e.g., side-by-side, top mount, etc.) or a dedicated freezer appliance as well. Additionally or alternatively, the present technology may be used with other types of appliances (e.g., home appliances) that have door or drawer handles. Consequently, the description set forth herein is for illustrative purposes only and is not intended to limit the technology in any aspect.

Doors to the fresh food chamber 122, refrigerator doors 128, may each be rotatably hinged to an edge of housing 120 providing selective access to the interior of the cabinet 120, for example providing access to fresh food chamber 122. It should be noted that while two doors 128 in a French door configuration are illustrated, any suitable arrangement of doors utilizing one, two, or more doors is within the scope and spirit of the present disclosure. A freezer door 130 may be arranged below refrigerator doors 128 for accessing freezer chamber 124. In the exemplary embodiment, freezer door 130 is coupled to a freezer drawer (not shown) slidably mounted within freezer chamber 124. An auxiliary door 127 may be coupled to an auxiliary drawer which may be slidably mounted within the auxiliary chamber.

Operation of the refrigerator appliance 100 can be regulated by a controller 134 that is operatively coupled to a user interface panel 136. User interface panel 136 may provide selections for user manipulation of the operation of refrigerator appliance 100 to modify environmental conditions therein, such as temperature selections, etc. In some embodiments, user interface panel 136 may be proximate a dispenser assembly 132. In response to user manipulation of the user interface panel 136, the controller 134 may operate various components of the refrigerator appliance 100. The controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controller 134 as disclosed herein is capable of and may be operable to perform any methods and associated method steps as disclosed herein.

The controller 134 may be positioned in a variety of locations throughout refrigerator appliance 100. In the illustrated embodiment, the controller 134 is located within the door 128. In such an embodiment, input/output ("I/O") signals may be routed between the controller and various operational components of refrigerator appliance 100. In one embodiment, the user interface panel 136 represents a general purpose I/O ("GPIO") device or functional block. In one embodiment, the user interface 136 includes input components, such as one or more of a variety of electrical, mechanical or electro-mechanical input devices including rotary dials, push buttons, and touch pads. The user interface 136 may include a display component, such as a digital or analog display device designed to provide operational feedback to a user. For example, the user interface 136 may include a touchscreen providing both input and display functionality. The user interface 136 may be in communication with the controller via one or more signal lines or shared communication busses.

Refrigerator appliance 100 may include one or more handle assemblies 150. For example, a first handle assembly 150 may be attached to freezer door 130, a second handle assembly 150 may be attached to auxiliary door 127, and third and fourth handle assemblies 150 may be attached to refrigerator doors 128. Hereinafter, a single handle assembly 150 will be described in detail in reference to attachment to freezer door 130. It should be understood that the description for handle assembly 150 may apply to one or more handles used to open or close any of the doors or drawers on a domestic appliance (e.g., refrigerator appliance 100). For instance, with respect to freezer door 130, handle assembly 150 may be secured to a front surface 131 of freezer door 130. Handle assembly 150 may be selectively coupled to one or more mounting posts 180 (FIGS. 5, 7, 8) protruding from freezer door 130, as will be described in more detail below.

In the illustrated embodiment of freezer door 130, handle assembly 150 is generally oriented in the horizontal position, i.e., parallel to the lateral L direction. One of ordinary skill in the art will recognize that the same or substantially similar attachment components may be useful in attaching a handle assembly 150 in a different orientations, for example in the vertical V direction (for example, as oriented on refrigerator doors 128).

Figure 2:
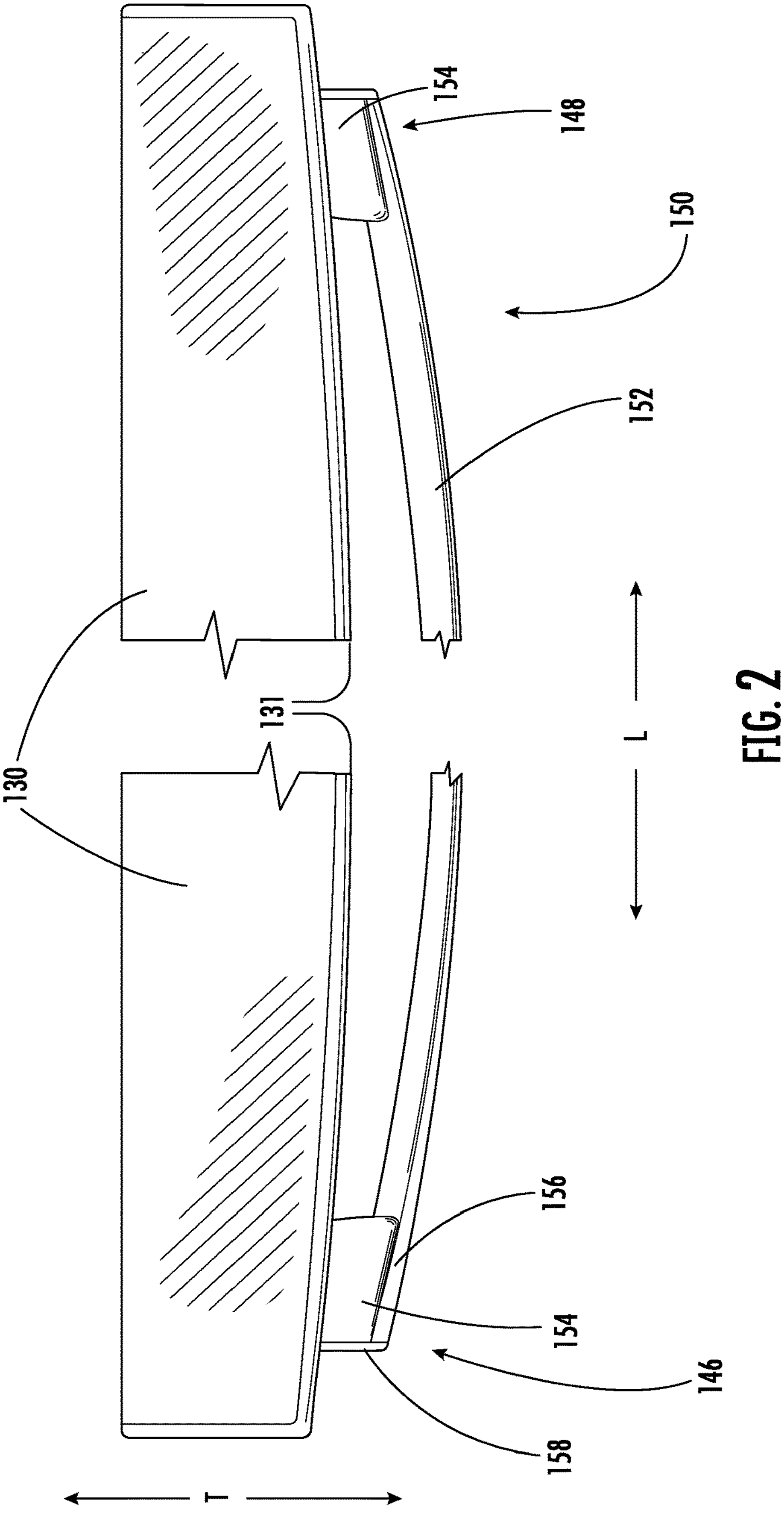
FIG. 2 provides a plan view of the freezer door handle of the refrigerator appliance of FIG. 1.
Figure 4:
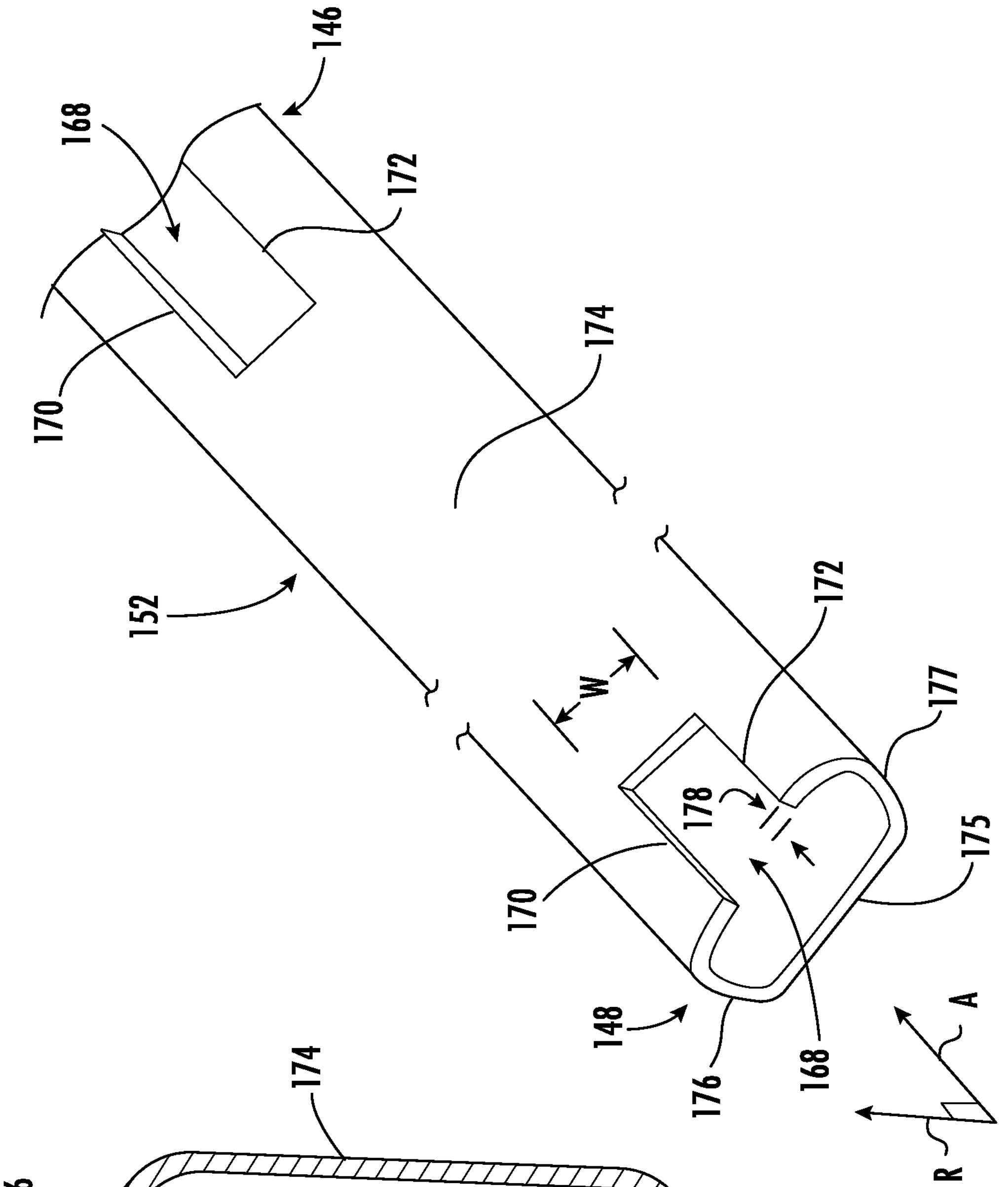
FIG. 4 provides a perspective view of a handle bar in accordance with an embodiment of the present disclosure.
Figure 3:
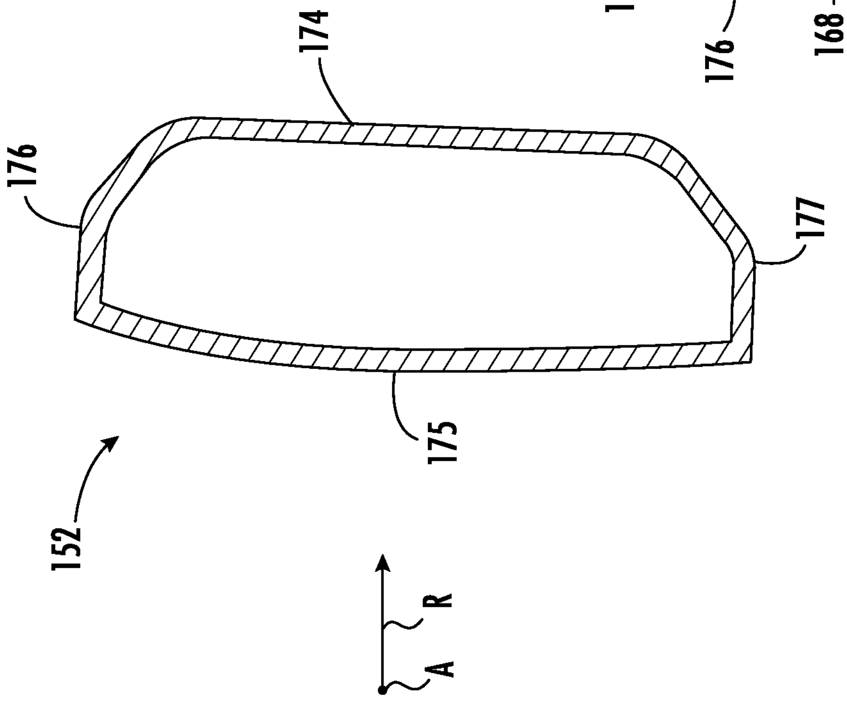
FIG. 3 provided a cross sectional view of the handle tube of the handle of FIG. 2 taken at II-II.

Turning generally to FIGS. 2 through 8, handle assembly 150 may include a handle tube 152. Handle tube 152 may be a relatively long, slender, generally hollow, tube extending predominantly along a bar axis (e.g., parallel to the long dimension of the handle tube 152, in the illustrated example, along the lateral direction L). When installed, handle tube 152 may be spaced apart from freezer door 130 such that a user may grasp handle tube 152 to pull open freezer door 130. In the illustrated embodiment, handle tube 152 has a closed, generally trapezoidal cross section (FIG. 3). According to some embodiments, handle tube 152 may be cylindrical in cross section, while in others, other closed, generally hollow cross section may be used. According to the illustrated exemplary embodiment, axial direction A is coaxial with the bar axis (e.g., predominantly parallel to the lateral direction L). Handle tube 152 may be curved (i.e., the axial direction A may form an arc in front of freezer door 130).

As illustrated in FIG. 3, the handle tube 152 may generally have a closed cross sectional configuration with an inner face 174 generally proximate to the front surface 131 when the handle bar is attached to the freezer door 130. The handle tube may also have outer face 175 generally directed away from freezer door 130. A top face 176 and a bottom face 177 connect the inner and outer faces 174, 175 and cooperate to form the closed cross sectional shape. In some embodiments, the handle tube 152 may be cylindrical, in which case the inner and outer faces 174, 175 and the top and bottom faces 176, 177 may be portions of the outer cylindrical surface.

According to embodiments of the present disclosure, handle tube 152 includes an axial slot 168 (FIG. 4) formed through the inner face 174 of at least one of the first end 146 and the second end 148 and extending at least partially along the bar axis in the axial direction A. The axial slot 168 is bordered or defined by first slot edge 170 and second slot edge 172. First and second slot edges 170, 172 may be parallel, or substantially parallel, and each slot edge 170, 172 may be formed generally parallel to the axial direction A and spaced apart from each other by the width W of the axial slot 168.

Handle assembly 150 may include one or more (generally a pair of) end caps 154 connected to the handle tube 152 (e.g., at opposite first end 146 and second end 148 relative to the axial direction A). End caps 154 may include elements to facilitate selective coupling of the handle assembly 150 to freezer door 130 (or any suitable door) as discussed below.

Figure 5:
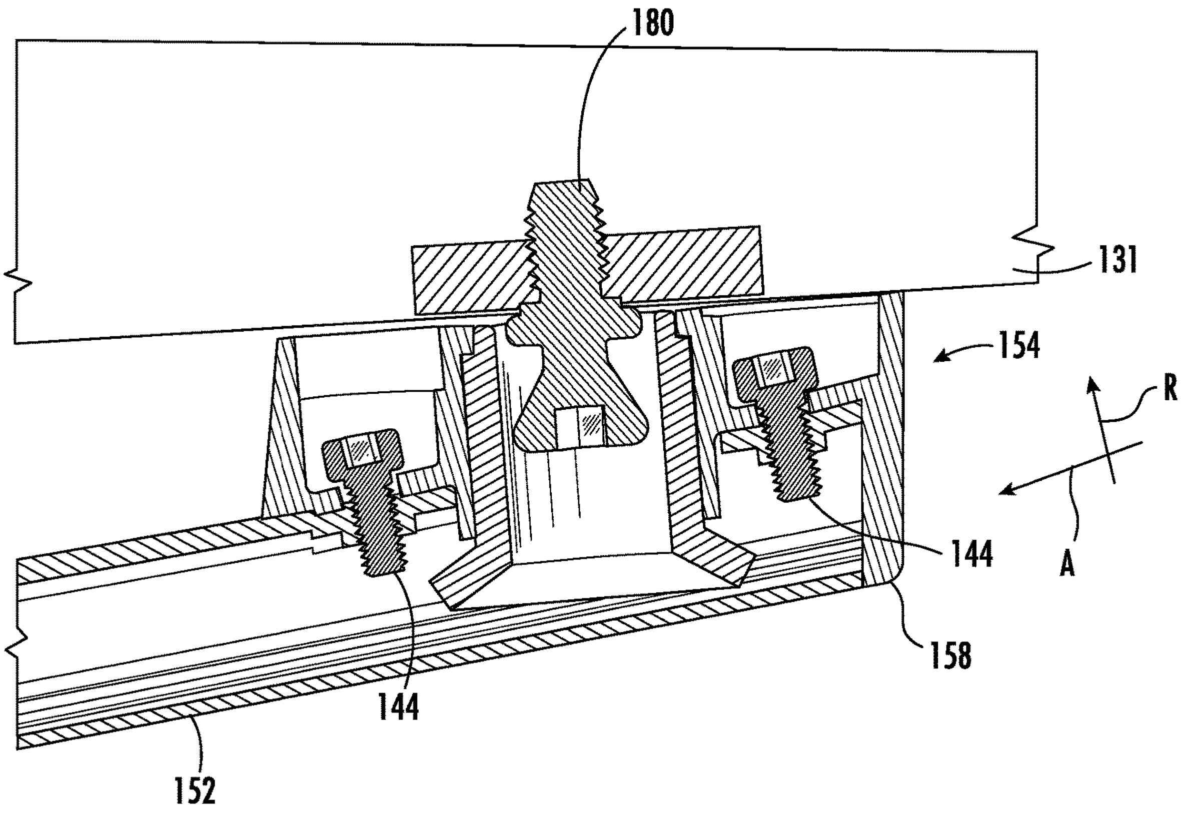
FIG. 5 provides an enlarged sectional view of the handle bar and end cap of FIG. 1 taken at V-V.

The end cap 154 may include a flange 158 at an axial end 166 of the end cap 154. As illustrated in FIGS. 2 and 5, in an assembled handle assembly 150, the flange 158 abuts an end of handle tube 152 (i.e., first or second end 146, 148). When in an abutting relationship, approximately radially oriented passages in the handle tube 152 and the end cap 154 may be aligned to accept fasteners (e.g., threaded fasteners 144) to fixedly attach the end cap 154 to the handle tube 152. In embodiments, the flange 158 may be configured to receive the first or second end of the handle tube 146, 148 within a recess (not shown). The flange 158 may cooperate with the end cap 154 to define a receiving portion 156 aligned with the axial direction at a radially outward portion (i.e., away from the door front surface 131) of the end cap 154. The receiving portion 156 may be configured to accept an end of the handle tube 152, for example a first end 146 or a second end 148. The handle tube 152 may be axially received into the receiving portion 156 and secured to the end cap 154, for example with threaded fasteners 144.

Figure 6:
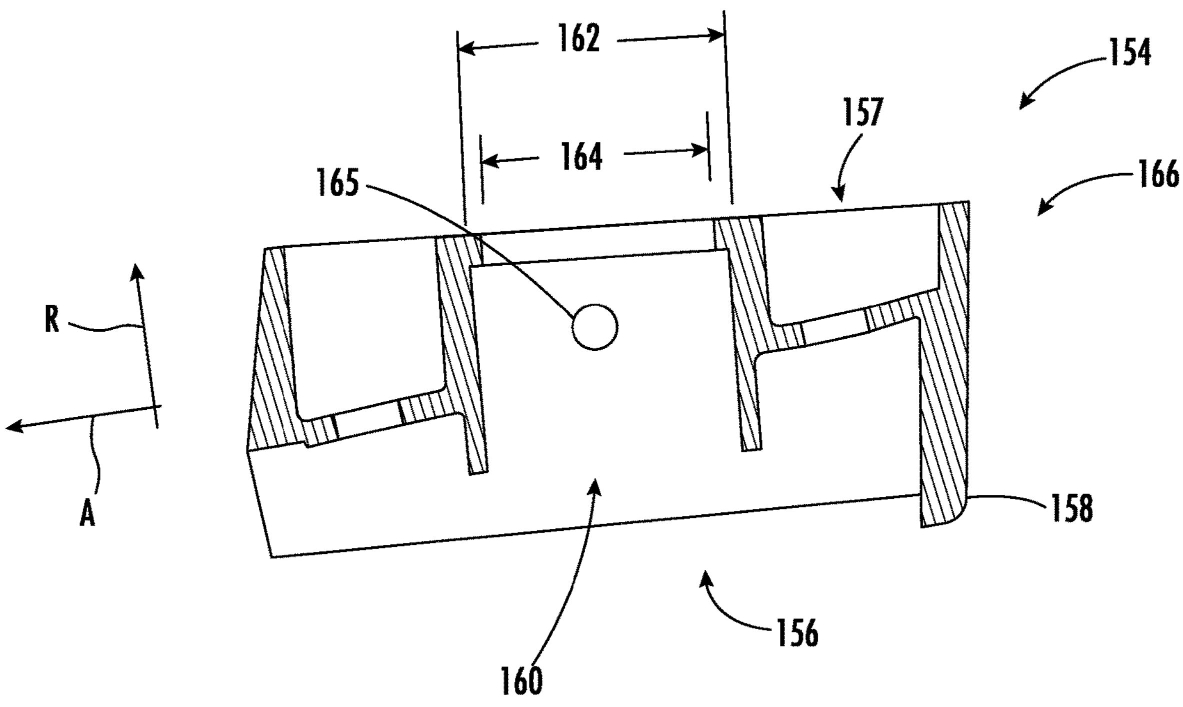
FIG. 6 provides a detailed sectional view of the end cap of FIG. 5 with other elements removed for clarity.

The end cap 154 also defines a through hole 160 aligned with the radial direction R as illustrated for example in FIGS. 5 and 6. Through hole 160 may be a circular hole, an elliptical (i.e., oval shaped) hole, a slot, or have any other cross-sectional shape configured to receive a bushing (described below). The through hole 160 passes from the receiving portion 156 to a mounting portion 157 on the radially opposite side of the end cap 154. The through hole 160 comprises a first inner diameter 162 and a second inner diameter 164 smaller than the first inner diameter 162. The first inner diameter 162 extends from the receiving portion 156 radially towards the mounting portion 157. The second inner diameter 164 extends from the mounting portion 157 partially along a radial length of the through hole 160. The second inner diameter 164 forms a shoulder at the mounting portion 157 of the end cap 154. A clearance hole 165 is formed through the side wall of the through hole, proximate to the mounting portion 157, at an angle to the radial direction R measured from the receiving portion 156. In other words, from the outside of the through hole 160, the clearance hole 165 is directed toward mounting portion 157.

A bushing 190 is received in the through hole 160 such that a first end 192 extends into the receiving portion 156 of the end cap 154 and a second end 194 of the bushing 190 is proximate to the mounting portion 157. The bushing may have a generally cylindrical shape as illustrated or may have a differently shaped body to be received in through hole 160. The bushing may be fixedly attached to the end cap 154, for example with adhesive, mechanical fasteners, or interference fit. The bushing 190 comprises a bushing wall 196 defining a receptacle 198 at the second end 194, the receptacle 198 configured to receive mounting post 180. Mounting post 180 may be fixedly attached to the door 130, for example via a threaded engagement with a backing plate 182, to facilitate mounting the end cap 154, and the handle assembly 150, to the door 130.

The exemplary bushing 190 includes a passage through the bushing wall 196, for example a threaded hole 200, oriented at substantially the same angular orientation to the radial direction R as the clearance hole 165. The threaded hole 200 has a diameter less than the clearance hole 165 such that a threaded fastener, for example a set screw 202, can pass through the clearance hole 165 and engage the threaded hole 200 when the clearance hole 165 and the threaded hole 200 are axially aligned. The set screw 202 may be advanced through the threaded hole 200 to engage a portion of the mounting post 180 to secure the end cap 154 and handle assembly 150 to the door 130. End caps 154, and accordingly handle assembly 150, may thus be tightened or loosened with respect to the door 130 via mounting post 180 and set screw 202.

Figure 7:
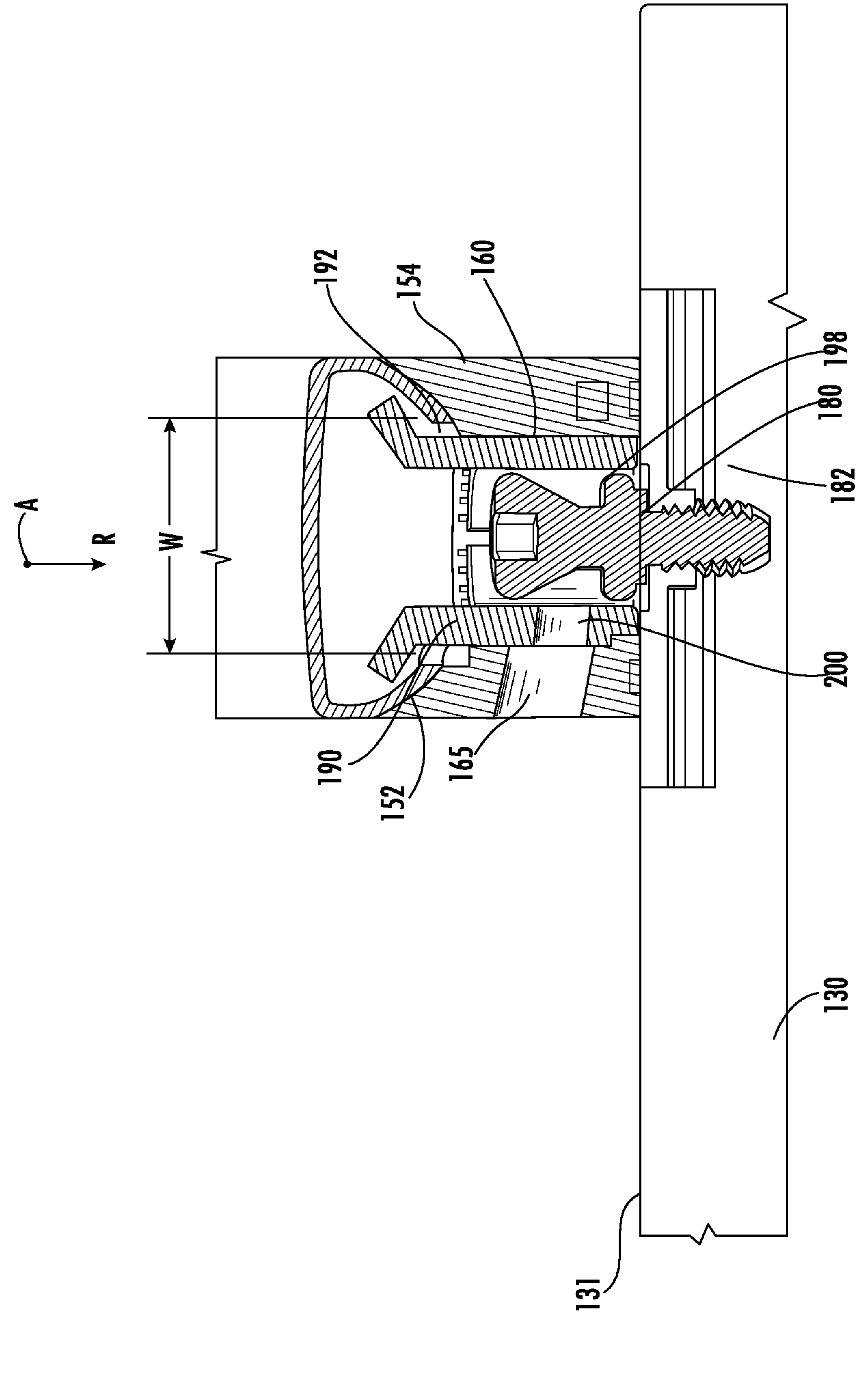
FIG. 7 provides an enlarged sectional view of a handle assembly of FIG. 1 taken at VII-VII in accordance with an embodiment of the present disclosure.
Figure 8:
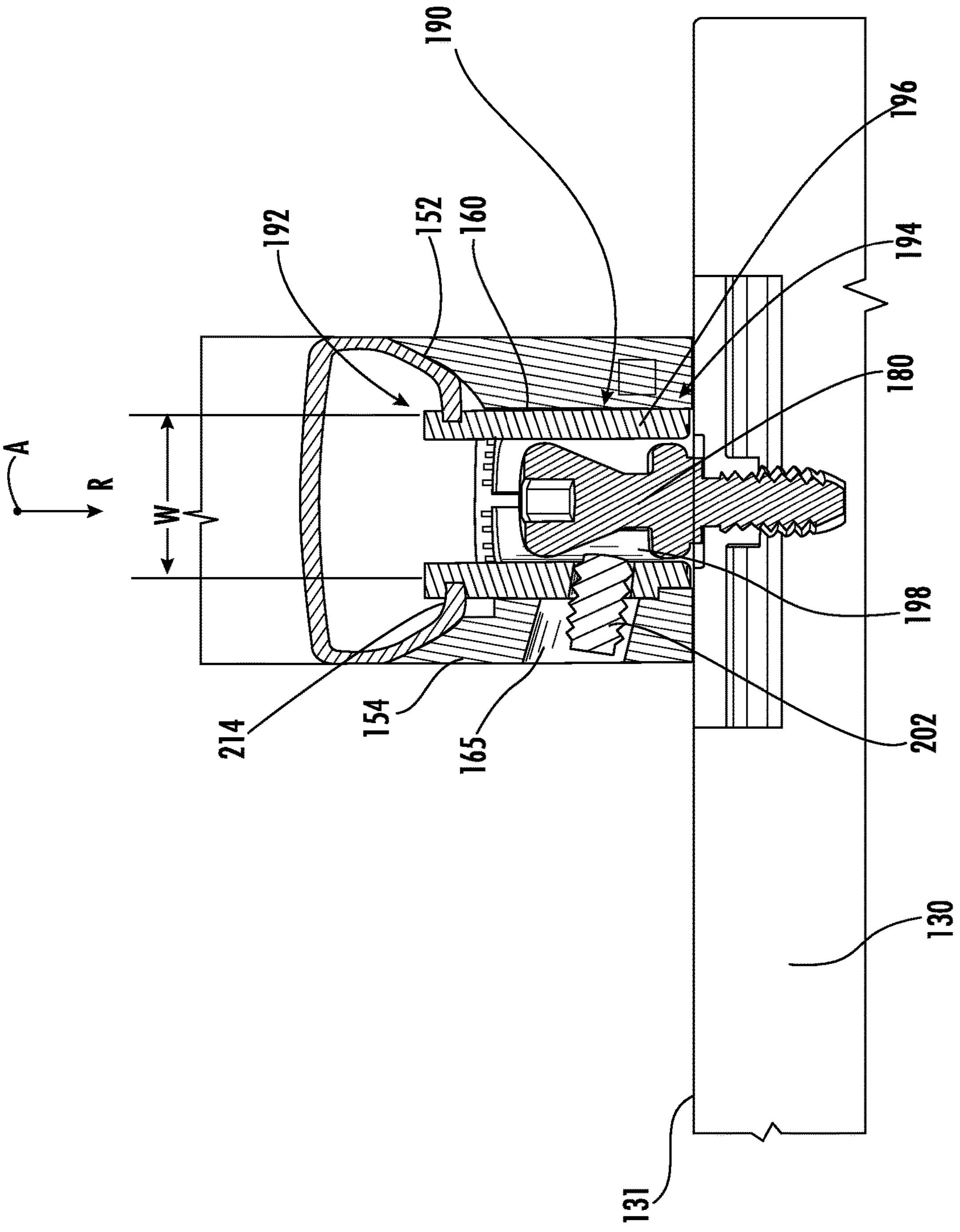
FIG. 8 provides an enlarged sectional view of a handle assembly of FIG. 1 taken at VII-VII in accordance with an embodiment of the present disclosure.

As illustrated, for example FIGS. 7 and 8, first end 192 of the bushing 190 extends into the receiving portion 156 of the end cap 154. The second end 194 is received in the through hole 160 proximate to the mounting portion 157. At the second end 194, bushing 190 includes a first outside dimension, for example diameter 204, and a smaller second outside dimension, for example diameter 206. The second outside diameter 206 extends from the second end 194 partially along the axial length of the bushing 190. First and second outside diameters 204, 206 are configured to be received in first and second inner diameters 162, 164 such that radial displacement of the bushing 190 in a direction towards the mounting portion 157 is blocked.

The first end of bushing 190 is configured to engage the handle tube 152 to limit or prevent radial displacement of the handle tube 152 from the end cap 154. In an embodiment, the first outside diameter 204 is less than the width W of the axial slot 168 formed in the handle tube 152. Accordingly, the end of the handle tube 152, for example first or second end 146, 148, may be slidingly received in an axial direction in the receiving portion 156. As the handle tube 152 slides into the receiving portion, the axial slot 168 receives a portion of the first end 192 of the bushing 190 within width W.

Figure 9:
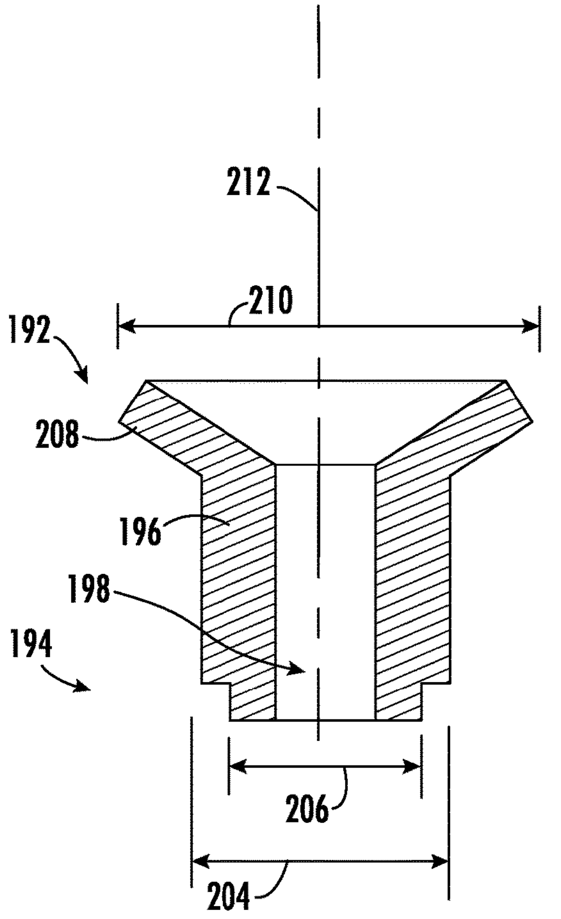
FIG. 9 provides an enlarged cross-sectional view of the exemplary bushing of FIG. 7.

According to an embodiment illustrated in FIGS. 7 and 9, bushing 190 comprises a flanged end or flanged portion 208 at the first end 192, the flanged portion 208 having a diameter 210 greater than the width W of the axial slot 168. The flanged portion 208 may be formed from the full first diameter 204 of the bushing. In other embodiments, the flange may be formed in a portion of the first diameter 204, for example in diametrically opposed portions of the first end 192. In embodiments including a flanged portion of the first diameter 204, the diameter across the flanged portion is greater than the width W.

As discussed above, a portion of the first outside diameter 204 of the bushing proximate to the first end 192 is received in the axial slot 168, with the flanged portion 208 extending into the generally hollow interior of the handle tube 152. In some embodiments, the flanged portion 208 creates an interference fit with a portion of the handle tube 152, the interference preventing, or substantially preventing, radial movement of the handle tube 152 with respect to the freezer door 130, in particular radial movement away from the front surface 131. In other embodiments, the flanged portion 208 is spaced apart from the interior of the handle tube 152 and limits radial movement of the handle tube 152 with respect to the front surface 131. For example, if the attachment of the bushing 190 to the end cap 154 failed, the end cap 154 in particular, and the handle assembly 150 in general, would not be secured to the door 130 in the manner described above. The same would be the case if the attachment of the handle tube 152 to the bushing 190 with fasteners 144 failed. The handle tube 152 would be free to displace in the radially outward direction with respect to the bushing 190 which remains fixed to the door 130. With the flanged portion 208, the radial displacement under such circumstances may be limited to a distance along the bushing axis 212 until the flanged portion 208 contacts or engages with the handle tube 152. At that point, the bushing 190 engages the handle tube 152 directly and the handle assembly 150 may be used as intended to appropriately open the door 130.

Figure 10:
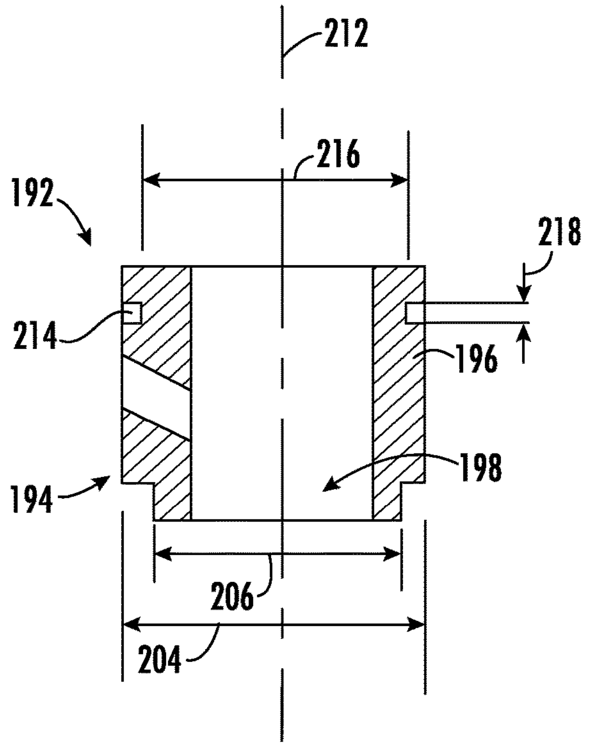
FIG. 10 provides an enlarged cross-sectional view of the exemplary bushing of FIG. 8.

In an embodiment illustrated in FIGS. 8 and 10, bushing wall 196 includes a slot 214, formed in the wall 196 proximate to the first end 192. The slot 214 may be formed such that the diameter 216 at the bottom of the slot is no greater than the width W of the axial slot 168. The slot thickness 218 is at least as great as the thickness 178 of the handle tube at the axial slot 168. The position of the slot 214 along the bushing axis 212 may correspond with the position of the first and second slot edges 170, 172 of the handle tube 152 when the handle tube 152 is slidingly received in the receiving portion 156.

According to the illustrative embodiment of FIG. 8, as the end (i.e., first or second end 146, 148) of the handle tube 152 is received in the receiving portion 156, a portion of the first and second slot edges 170, 172 is received in, and engages with, the slot 214. Accordingly, in this embodiment, the handle tube 152 is fixedly attached to the bushing 190 independent of any other attachments, such as the handle tube 152 to the end cap 154, or the end cap 154 to the bushing 190. For example, if the other attachments fail, the handle tube 152 attachment to the door 130 remains and the handle assembly 150 can be used to open the freezer door 130.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A handle assembly for a domestic appliance defining an axial direction and a radial direction, the handle assembly comprising:

an end cap defining a receiving portion aligned with the axial direction, the end cap further defining a through hole aligned with the radial direction;

a bushing comprising a first end, a second end, and a bushing wall defining a receptacle at the second end, the bushing received in the through hole; and a handle tube defining an axial slot formed at a first end, wherein the first end of the handle tube is axially received in the receiving portion, wherein the first end of the bushing extends into the receiving portion, wherein the bushing wall further defines a first outside diameter and a second outside diameter smaller that the first outside diameter, the second outside diameter extending from the second end partially along an axial length of the bushing, wherein the first outside diameter is less than a width of the axial slot and a portion of the bushing proximate to of the bushing is received in the axial slot, and wherein the first end of the bushing comprises a flanged end, the flange having a diameter greater than the width of the axial slot.

2. The handle assembly of claim 1, wherein the flange creates an interference fit with the handle tube.

3. The handle assembly of claim 1, wherein the bushing is fixedly attached to the end cap.

4. The handle assembly of claim 1, wherein the end cap is fixedly attached to the handle tube.

5. The handle assembly of claim 1, wherein the end cap comprises a flange at an axial end of the end cap, the first end of the handle tube received in the flange.

6. The handle assembly of claim 1, wherein the axial slot is bordered by a first slot edge and a second slot edge spaced apart by the width of the axial slot, wherein the bushing wall forms a diameter greater than the width of the axial slot, wherein the bushing further comprises a slot formed in the bushing wall proximate to of the bushing, the slot having a diameter no greater than the width of the axial slot, and wherein a portion of the first slot edge and the second slot edge are received in the slot.

7. The handle assembly of claim 6, wherein the first slot edge and the second slot edge are substantially parallel.

8. A domestic appliance comprising:

a cabinet;

a door providing selective access to an interior of the cabinet; and a handle assembly attached to the door and defining an axial direction and a radial direction, the handle assembly comprising:

an end cap defining a receiving portion aligned with the axial direction, the end cap further defining a through hole aligned with the radial direction;

a bushing comprising a first end, a second end, and a bushing wall defining a receptacle at the second end, the bushing received in the through hole; and a handle tube defining an axial slot formed at a first end, wherein the first end of the handle tube is axially received in the receiving portion and wherein the first end of the bushing extends into the receiving portion, wherein the bushing wall further defines a first outside diameter and a second outside diameter smaller than the first outside diameter, the second outside diameter extending from the second end partially along an axial length of the bushing, wherein the first outside diameter is less than a width of the axial slot and a portion of the bushing proximate to of the bushing is received in the axial slot, and wherein the first end of the bushing comprises a flanged end, the flange having a diameter greater than the width of the axial slot.

9. The domestic appliance of claim 8, wherein the flange creates an interference fit with the handle tube.

10. The domestic appliance of claim 8, wherein the bushing is fixedly attached to the end cap.

11. The domestic appliance of claim 8, wherein the end cap is fixedly attached to the handle tube.

12. The domestic appliance of claim 8, wherein the end cap comprises a flange proximate to the first end of the handle tube, the first end of the handle tube received in the flange.

13. The domestic appliance of claim 8, wherein the axial slot is bordered by a first slot edge and a second slot edge spaced apart by the width of the axial slot, wherein the bushing wall forms a diameter greater than the width of the axial slot, wherein the bushing further comprises a slot formed in the bushing wall proximate to of the bushing, the slot having a diameter no greater than the width of the axial slot, and wherein a portion of the first and second slot edges is received in the slot.

14. The domestic appliance of claim 13, wherein the first slot edge and the second slot edge are substantially parallel.

15. A handle assembly for a domestic appliance defining an axial direction and a radial direction, the handle assembly comprising:

an end cap defining a receiving portion aligned with the axial direction, the end cap further defining a through hole aligned with the radial direction;

a bushing comprising a first end, a second end, and a bushing wall defining a receptacle at the second end, the bushing received in the through hole; and a handle tube defining an axial slot formed at a first end, wherein the first end of the handle tube is axially received in the receiving portion, wherein the first end of the bushing extends into the receiving portion, wherein the axial slot is bordered by a first slot edge and a second slot edge spaced apart by a width of the axial slot, wherein the bushing wall forms a diameter greater than the width of the axial slot, of the bushing wherein the bushing further comprises a slot formed in the bushing wall proximate to of the bushing, the slot having a diameter no greater than the width of the axial slot, and wherein a portion of the first slot edge and the second slot edge are received in the slot.

16. The handle assembly of claim 15, wherein the first slot edge and the second slot edge are substantially parallel.

17. The handle assembly of claim 15, wherein the bushing is fixedly attached to the end cap.

18. The handle assembly of claim 15, wherein the end cap is fixedly attached to the handle tube.

19. The handle assembly of claim 15, wherein the end cap comprises a flange at an axial end of the end cap, the first end of the handle tube received in the flange.

* * * * *